(12) United States Patent
Nakata

(10) Patent No.: US 12,192,936 B2
(45) Date of Patent: Jan. 7, 2025

(54) COMMUNICATION DEVICE, METHOD FOR COMMUNICATION DEVICE, AND PROGRAM PRODUCT FOR COMMUNICATION DEVICE

(71) Applicant: DENSO CORPORATION, Kariya (JP)

(72) Inventor: Tsuneo Nakata, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 371 days.

(21) Appl. No.: 17/861,804

(22) Filed: Jul. 11, 2022

(65) Prior Publication Data

US 2022/0353053 A1     Nov. 3, 2022

Related U.S. Application Data

(63) Continuation of application No. PCT/JP2020/039283, filed on Oct. 19, 2020.

(30) Foreign Application Priority Data

Jan. 14, 2020   (JP) .................................. 2020-003656

(51) Int. Cl.
*H04W 56/00*     (2009.01)
*H04L 43/0864*   (2022.01)

(52) U.S. Cl.
CPC ....... *H04W 56/004* (2013.01); *H04L 43/0864* (2013.01)

(58) Field of Classification Search
CPC ............. H04W 56/004; H04W 56/005; H04W 56/0055; H04W 56/0065; H04L 43/08; H04L 43/0852; H04L 43/0858; H04L 43/0864; H04L 43/16
See application file for complete search history.

(56) References Cited

U.S. PATENT DOCUMENTS

| | | | |
|---|---|---|---|
| 6,769,029 B1 * | 7/2004 | Seki .................... | H04L 43/0852 370/473 |
| 7,844,725 B2 * | 11/2010 | Labonte ................ | H04L 65/752 370/235 |
| 11,191,053 B1 * | 11/2021 | Ouellette ............ | H04W 56/007 |

(Continued)

FOREIGN PATENT DOCUMENTS

| | | | | |
|---|---|---|---|---|
| EP | 3271742 B1 * | 8/2023 | ........... | G01S 13/765 |
| JP | 2010081558 A | 4/2010 | | |

(Continued)

*Primary Examiner* — Kevin D Mew
(74) *Attorney, Agent, or Firm* — Harness, Dickey & Pierce, P.L.C.

(57) ABSTRACT

A communication device includes a first clock, a communication unit, a delay time acquiring unit, a selection unit, and a correction unit. The communication unit is configured to receive first packets from an outside communication device including a second clock and transmit second packets to the outside communication device. The delay time acquiring unit is configured to a first delay time and a second delay time. The selection unit is configured to select one of the first packet and the second packet as a target packet. The correction unit is configured to calculate a correction value based on a first minimum delay time or a second minimum delay time, and correct the delay time of the target packet using the correction value.

11 Claims, 10 Drawing Sheets

(56) References Cited

U.S. PATENT DOCUMENTS

| | | | | |
|---|---|---|---|---|
| 2009/0003379 | A1* | 1/2009 | Shao | H04N 21/4122 |
| | | | | 370/466 |
| 2010/0329125 | A1* | 12/2010 | Roberts | H04L 41/12 |
| | | | | 370/503 |
| 2017/0210441 | A1* | 7/2017 | Jaeger | B29C 70/86 |
| 2017/0367065 | A1* | 12/2017 | Seth | H04L 43/0864 |
| 2020/0366608 | A1* | 11/2020 | Pan | H04L 47/127 |
| 2021/0058180 | A1* | 2/2021 | Agrawal | H04W 56/004 |
| 2022/0150859 | A1* | 5/2022 | Agrawal | H04W 56/006 |

FOREIGN PATENT DOCUMENTS

| | | | | |
|---|---|---|---|---|
| JP | 2017073689 A | | 4/2017 | |
| WO | WO-2020236599 A1 | * | 11/2020 | H04B 7/2659 |

* cited by examiner

COMMUNICATION DEVICE, METHOD FOR COMMUNICATION DEVICE, AND PROGRAM PRODUCT FOR COMMUNICATION DEVICE

CROSS REFERENCE TO RELATED APPLICATION

The present application is a continuation application of International Patent Application No. PCT/JP2020/039283 filed on Oct. 19, 2020, which designated the U.S. and claims the benefit of priority from Japanese Patent Application No. 2020-003656 filed on Jan. 14, 2020. The entire disclosures of all of the above applications are incorporated herein by reference.

TECHNICAL FIELD

The present disclosure relates to a communication device configured to transmit and receive packets through a communication network.

BACKGROUND

Conventionally, delay time has been used as one of indicators of communication quality in communication that requires real-time performance, such as voice communication and IoT (Internet of Things). Such a delay time can be obtained by measuring the elapsed time from the time when the communication device transmits the packet to the time when another communication device receives the packet. However, in order to obtain an accurate delay time, it is necessary to accurately synchronize the times of the communication devices on the transmitting side and the receiving side.

As a method of obtaining the delay time without synchronizing the times of the communication devices on the transmitting side and the receiving side, there is a method using Ping, for example. In this method, Ping is used to measure the time it takes for a packet to make a round trip between two communication devices, and the value obtained by halving the measurement result is estimated to be the one-way delay time. However, the Ping value measured in this way includes the processing time required from the reception of the packet by one of the communication devices to the transmission of the packet by the communication device. Therefore, there may be a high possibility that there is a difference between the value obtained by halving the Ping value and the actual one-way delay time.

SUMMARY

A first aspect of the present disclosure is a communication device configured to communicate with an outside communication device to transmit and receive packets through a communication network. The outside communication device includes a second clock. The communication device includes a first clock and a communication unit configured to receive first packets transmitted from the outside communication device, and transmit second packets to the outside communication device. The communication device includes a delay time acquiring unit configured to acquire a first delay time that is a time length from a second device transmission time when the first packet is transmitted from the outside communication device to a first device reception time when the communication unit receives the first packet, the second device transmission time being a time indicated by the second clock, the first device reception time being a time indicated by the first clock, and a second delay time that is a time length from a first device transmission time when the communication unit transmits the second packet to a second device reception time when the outside communication device receives the second packet, the first device transmission time being a time indicated by the first clock, the second device reception time being a time indicated by the second clock. The communication device includes a selection unit configure to select one of the first packet and the second packet as a target packet. The communication device includes a correction unit configured to calculate a correction value as a time difference of the first clock and the second clock based on a first minimum delay time that is a minimum value among the first delay times acquired in a predetermined period or a second minimum delay time that is a minimum value among the second delay times acquired in the predetermined period, and correct the delay time of the target packet using the correction value.

A second aspect of the present disclosure is a computer program product for a communication device to correct a delay time. The communication device includes a first clock and is configured to communicate with an outside communication device to transmit and receive packets through a communication network. The outside communication device includes a second clock. The computer program product is stored on a non-transitory computer readable medium and comprising instruction configured to, when executed by at least one processor, cause the at least one processor to: receive first packets transmitted from the outside communication device; transmit second packets to the outside communication device; acquire a first delay time that is a time length from a second device transmission time when the first packet is transmitted from the outside communication device to a first device reception time when the communication unit receives the first packet, the second device transmission time being a time indicated by the second clock, the first device reception time being a time indicated by the first clock, and a second delay time that is a time length from a first device transmission time when the communication unit transmits the second packet to a second device reception time when the outside communication device receives the second packet, the first device transmission time being a time indicated by the first clock, the second device reception time being a time indicated by the second clock; select one of the first packet and the second packet as a target packet; calculate a correction value as a time difference of the first clock and the second clock based on a first minimum delay time that is a minimum value among the first delay times acquired in a predetermined period or a second minimum delay time that is a minimum value among the second delay times acquired in the predetermined period, and correct the delay time of the target packet using the correction value.

A third aspect of the present disclosure is a method of correcting a delay time for a communication device including a first clock and configured to communicate with an outside communication device to transmit and receive packets through a communication network. The outside communication device includes a second clock. The method includes receive first packets transmitted from the outside communication device; transmit second packets to the outside communication device; acquire a first delay time that is a time length from a second device transmission time when the first packet is transmitted from the outside communication device to a first device reception time when the communication unit receives the first packet, the second device transmission time being a time indicated by the second clock, the first device reception time being a time indicated by the first clock, and a second delay time that is a time length from a first device transmission time when the communication unit transmits the second packet to a second device reception time when the outside communication device receives the second packet, the first device transmission time being a time indicated by the first clock, the second device reception time being a time indicated by the second clock; select one of the first packet and the second packet as a target packet; calculate a correction value as a time difference of the first clock and the second clock based on a first minimum delay time that is a minimum value among the first delay times acquired in a predetermined period or a second minimum delay time that is a minimum value among the second delay times acquired in the predetermined period, and correct the delay time of the target packet using the correction value.

EMBODIMENTS

Comparative Example

Figure 1:
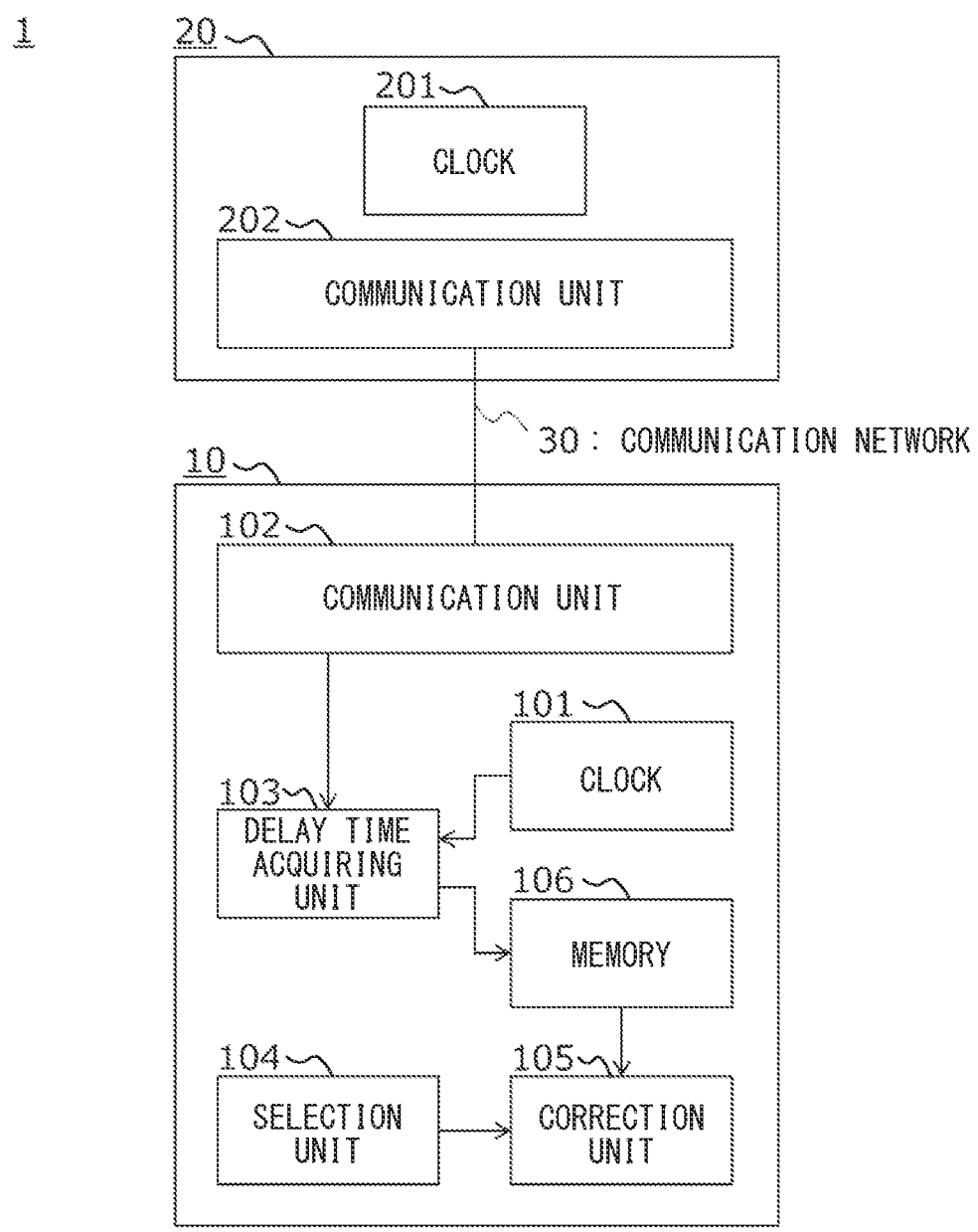
FIG. 1 is a block diagram illustrating a communication device and a communication system including the communication device.

A comparative example is a communication device for estimating a delay time of a packet transmitted between two communication devices whose times are not synchronized using (i) a one-way network delay reference time from a measurement server to an access point, (ii) a wireless delay reference time obtained by transmitting packets between the access point and a wireless communication device whose time is synchronized with the access point, and (iii) a round-trip time obtained by measuring a time when the packet makes a round trip between the communication devices.

As a result of detailed consideration by the inventor, the inventor found the following difficulty. Since the delay occurring in the communication network varies depending on the communication device, the delay time measured using a communication device or communication section different from the actual communication partner is not suitable to estimate the delay time in the communication with the communication partner. Further, when estimating the delay time between communication devices, it is not always possible to obtain the delay time between the access point and another communication device whose time is synchronized with the access point.

Embodiments of the present disclosure will be described below with reference to the drawings. The present invention referred hereinafter indicates the invention described in the claims, and is not limited to the following embodiments. Further, at least words inside the double quotation means words and phrases described in the claims, and are not limited to the following embodiments.

Configurations and methods descried in dependent claims should be interpreted as arbitrary configurations and arbitrary methods within descriptions in independent claim. Configurations and methods of following embodiments corresponding to configurations and methods described in dependent claims, and configurations and methods described only in the following embodiments without descriptions in claims should be interpreted as arbitrary configurations and arbitrary methods in this disclosure. In a case that the scope of claims is broader than descriptions of the embodiments, configurations and methods described in the following embodiments are just examples of configurations and methods of the present disclosure, which should be interpreted as arbitrary configurations and arbitrary methods in this disclosure. In any cases, essential configurations and methods of this disclosure should be interpreted based on independent claims.

Any effects described in the embodiments are effects obtained by a configuration of an embodiment as an example of this disclosure, and are not necessarily effects of this disclosure.

When there are a plurality of embodiments, the configuration disclosed in each embodiment is not limited to each embodiment alone, and may be combined across the embodiments. For example, the configuration disclosed in one embodiment may be combined with another embodiment. Further, the disclosed configurations may be collected and combined in each of the plurality of embodiments.

The problem described in this disclosure is not a publicly known problem, but person including the inventor has independently found out, and is a fact that affirms the inventive step of the invention together with the configuration and method of the present disclosure.

(Configurations Common to Each Embodiment)

FIG. 1 shows a communication system 1. The communication system 1 includes a "communication device" 10, another "communication device" 20, and a "communication network" 30 for the communication between the communication devices 10, 20.

The "communication device" is configured to at least transmit or receive packets. For example, the communication device includes a receiver device, a receiver terminal device, a transmitter device, a transmitter terminal device, and a server device, such as various server devices, workstations, personal computers. The communication device may be an electronic control device (ECU), a semiconductor circuit element, a smartphone, a mobile phone, a communication repeater or the like. The "communication network" includes a wireless communication network and a wired communication network.

In the description of the following embodiments, both communication devices 10, 20 are communication device terminals. However, the communication devices 10, 20 may be server devices. For example, the communication device 10 may be a client device such as a personal computer, and the communication device 20 may be a server device.

The communication network 30 may be any one of the wired communication network and the wireless communication network. The wired communication network is, for example, a telephone line or an internet. The wireless communication network is, for example IEEE802.11 (WiFi: registered trademark), IEEE802.16 (WiMAX: registered trademark), W-CDMA (Wideband Code Division Multiple Access), HSPA (High Speed Packet Access), LTE (Long Term Evolution), LTE-A (Long Term Evolution Advanced), 4G, or 5G.

(1) Configuration of Communication Device 10

The communication device 10 includes a clock 101 (corresponding to a "first clock"), a communication unit 102, a delay time acquiring unit 103, a selection unit 104, a correction unit 105, and a memory 106.

The clock 101 is a "clock" that is a reference for time information in the communication device 10. The time when the communication device 10 receives packets and the time when the communication device 10 transmits packets are given based on the time indicated by the clock 101.

The term "clock" includes not only those that measure absolute time, but also those that counts predetermined intervals, such as counters and oscillators.

The communication unit 102 is configured to receive packets transmitted from the communication unit 20 (corresponding to an "outside communication device"). Hereinafter, the packet received by the communication unit 102 is referred to as a received packet (corresponding to a "first packet"). The received packet contains information indicating the time when the received packet is transmitted from the communication device 20. The time here is a transmission time based on a clock 201 of the communication device 20 described later.

The communication unit 102 is configured to transmit packets to the communication device 20 through the communication network 30. Hereinafter, the packet transmitted by the communication unit 102 is referred to a transmitted packet (corresponding to a "second packet"). Unless otherwise specified in the following embodiments, the information contained in the transmitted packet is not limited.

The delay time acquiring unit 103 is configured to "acquire" a delay time which is the time length from the "transmission time" when the packet is transmitted to the "reception time" when the packet is received. When the transmission time of the packet is defined as ts and the reception time is defined as tr, the delay time from the transmission time ts to the reception time tr can be obtained by calculating tr−ts. Hereinafter, the time length between the transmission time ts and the reception time tr is referred to as the delay time Td of the packet.

The term "acquire" may mean "directly acquire the delay time by receiving information indicating the delay time" or "acquire the delay time by calculation".

The "transmission time" may be a time when processing related to the transmission of the packet is performed. The transmission time may be a time when a generated packet is output, or a time when a packet to be transmitted is generated, for example. The "reception time" may be a time when processing related to the reception of the packet. The reception time may be a time when the packet arrives at the communication device, or a time when the received packet is stored in the memory, for example.

When the delay time acquiring unit 103 acquires the delay time of the received packet, the delay time acquiring unit 103 acquires, as the delay time (corresponding to a "first delay time") of the received packet, the time length between the transmission time $ts_{20}$ (corresponding to a "second device transmission time") when the received packet is transmitted from the communication unit 20 and the reception time $tr_{10}$ (corresponding to a "device reception time") when the communication unit 102 receives the reception packet. The transmission time of the received packet is the time based on the clock 201, and the reception time of the received packet is the time based on the clock 101.

When the delay time acquiring unit 103 acquires the delay time of the transmitted packet, the delay time acquiring unit 103 acquires, as the delay time (corresponding to a "second delay time") of the transmitted packet, the time length between the transmission time $ts_{10}$ (corresponding to a "device transmission time") when the transmitted packet is transmitted from the communication unit 102 and the reception time $tr_{20}$ (corresponding to "second device reception time") when the communication device 20 receives the transmitted packet. The transmission time of the transmitted packet is the time based on the clock 101, and the reception time of the transmitted packet is the time based on the clock 201.

The method in which the delay time acquiring unit 103 acquires the delay time of the transmitted packet is not limited. For example, the communication device 20 may calculate the delay time of the transmitted packet, and the delay time acquiring unit 103 may acquire the delay time calculated by the communication device 20. In this case, the transmitted packet transmitted from the communication unit 102 to the communication device 20 contains information indicating the transmission time when the communication device 10 transmitted the transmitted packet. When the communication device 20 receives the transmitted packet, the communication device 20 calculates the delay time from the transmission time contained in the transmitted packet to the reception time when the communication device 20 received the transmitted packet. The communication device 20 transmits a packet containing information about the calculated delay time to the communication device 10. Accordingly, the packet received by the communication unit 102 contains the delay time of the past transmitted packet. The delay time acquiring unit 103 acquires the delay time contained in the transmitted packet received by the communication unit 102.

The delay time acquiring unit 103 may acquire the delay time of the transmitted packet transmitted from the communication device 10 by calculating it. In this case, the received packet received by the communication unit 102 contains information indicating the time when the past transmitted packet transmitted from the communication device 10 is received by the communication device 20. The delay time acquiring unit 103 acquires the delay time of the transmitted packet by calculating the delay time from the transmission time when the communication unit 102 transmitted the transmitted packet to the reception time when the transmitted packet is received by the communication device 20. The transmission time and the reception time of the transmitted packet may be associated with each other using notification information of the transmitted packet.

Depending on the processing speed of the communication devices 10, 20, it takes a processing time from the reception of the packet to the time when the timestamp is added to the packet. Accordingly, the time when the communication unit 102 receives the received packet may not be exactly the same as the time of the timestamp added to the received packet. However, since the error caused by such timestamp processing is extremely small as compared with the delay time described later, the time added to the received packet is regarded to be the same as the time when the communication unit 102 actually receives the packet.

The selection unit 104 is configured to "select" a packet from the received packets and the transmitted packets as a target packet whose delay time is corrected by the correction unit 105.

One packet may be "selected" from multiple packets as a target packet, and multiple packets may be "selected" as target packets.

The correction unit 105 is configured to correct an error in the delay time of the target packet selected by the selection unit 104, which is caused by the time difference between the first clock 101 and the second clock 201. Specifically, the correction unit 105 "calculates" a correction value a by estimating the correction value a which corresponds to the time difference between the clocks 101, 201. The correction value a is calculated based on a minimum delay time $Td_{rmin}$ (corresponding to a "first minimum delay time") having the smallest value among the received packets acquired by the delay time acquiring unit 103 within a "predetermined" period, or based on a minimum delay time $Td_{smin}$ (corresponding to a "second minimum delay time") having the minimum value among the transmitted packets acquired within a "predetermined" period. Specific calculation methods of the correction value a will be described later. The correction unit 105 corrects the delay time of the target packet using the calculated correction value a. The delay time that was corrected using the correction value is referred to as a corrected delay time.

The term "calculate" may mean "calculate the correction value by performing an operation on the minimum delay time" or "set the value of the minimum delay time as the correction value". Here, the term "predetermined" may include "always constant" and "uniquely determined according to conditions".

For example, a period before the delay time of the target packet is acquired may be the predetermined period. In this case, the delay time of the target packet is corrected based on the minimum delay time having the smallest value among the delay times of the packets acquired before the target packet. Alternatively, the predetermined period may be the entire period for which the delay times of the packets are stored in the memory 106.

The corrected delay time is presented to, for example, users of the communication device 10. Alternatively, the corrected delay time may be output to an application related to communication that requires real-time performance, such as voice communication, IoT, and remote monitoring system, and may be used as an index of communication quality.

The memory 106 is a storage unit that stores the minimum delay time $Td_{rmin}$, $Td_{smin}$ used by the correction unit 105. Although it is assumed that the memory is a random access memory, the RAM 107 may be a hard disk (HDD), a flash memory, or the like. In this case, when the power source of the communication device 10 is turned off, data is not deleted, and can be stored.

The memory 106 may save the delay time immediately after the delay time acquiring unit 103 acquires the delay time, or may save the delay time after the correction unit 105 completes processing.

The memory 106 may be a storage unit that stores the transmission time and the reception time of the received packet and the transmitted packet. In this case, the delay time acquiring unit 103 read out the transmission time and the reception time of packets stored in the memory 106 to acquire the delay time.

Figure 2A:
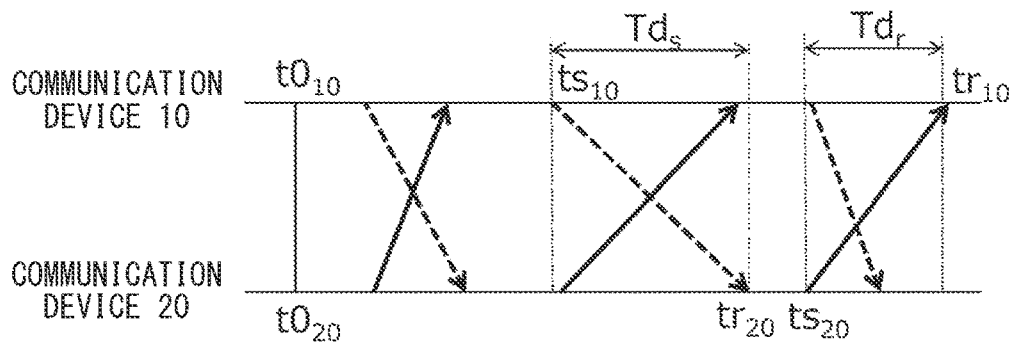
FIG. 2A is a diagram for explaining times indicated by clocks of the communication devices.
Figure 2B:
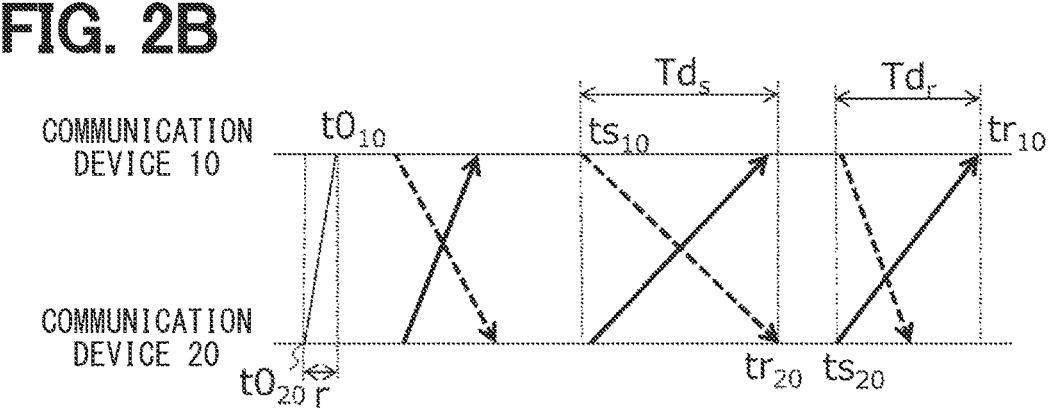
FIG. 2B is a diagram explaining times indicated by the clocks of the communication devices.

FIGS. 2A, 2B schematically show examples of a state in which packets are transmitted and received between the communication devices 10, 20. The times $t0_{10}$, $tr_{10}$, $ts_{10}$ are the times indicated by the clock 101, and the times $t0_{20}$, $tr_{20}$, $ts_{20}$ are the times indicated by the clock 201. Further, $t0_{10}$ and $t0_{20}$ indicate the same time. In FIG. 2A, the clocks 101, 201 are synchronized, and accordingly the timing at which the clock 101 indicates the time $t0_{10}$ is the same as the timing at which the clock 201 indicates the time $t0_{20}$. Accordingly, the delay time Td (=tr−ts) acquired by the delay time acquiring unit 103 is equal to the delay time (hereinafter, referred to as an actual delay time) between the time when one communication device transmits a packet and the time when the other communication device receives the packet.

On the other hand, in FIG. 2B, the timing at which the clock 101 indicates the time $t0_{10}$ and the timing at which the clock 201 indicates time $t0_{20}$ are different, resulting in a time difference r between the times indicated by these clocks. When the clocks 101, 201 are not synchronized as shown in FIG. 2B, the delay time Td (=tr−ts) acquired by the delay time acquiring unit 103 is different from the actual delay time. If the time difference r is a known value, the actual delay time of the transmitted packet can be obtained by calculating $tr_{20}-(ts_{10}+r)$. However, the time difference r between the clocks 101, 201 is unknown. The correction unit 105 estimates the actual delay time by correcting the delay time using the correction value an estimated to correspond to the time difference r. The following formula 1 is a formula for calculating the corrected delay time $T_s$ by correcting the delay time $Td_s$ of the transmitted packet using the correction value a.

$$T_s = tr_{20}-(ts_{10}+a) = Td_s - a \quad \text{(Formula 1)}$$

The formula 1 is a formula for calculating the corrected delay time $T_s$ of the transmitted packet. However, the corrected delay time $T_s$ of the received packet can be calculated by a similar formula. The following formula 2 is a formula for calculating the corrected delay time $T_r$ of the received packet.

$$T_r = (tr_{10}+a) - ts_{20} = Td_r + a \quad \text{(Formula 2)}$$

The information of the delay time acquired by the methods described in the following embodiments is required by the communication device that transmitted the packet. Accordingly, in the following embodiment, an example where the delay time of the transmitted packet is corrected as the target packet will be described. However, the following embodiment can be applied to a case where the delay time of the received packet is corrected as the target packet.

(2) Configuration of Communication Device 20

The communication device 2 is configured to transmit packets to the communication device 10. The communication device 20 includes the "clock" 201 that is a reference for time in the communication device 20, and the communication unit 202 configured to transmit and receive packets between the communication unit 10. Unless otherwise noted in each of the following embodiments, the communication device 20 is a communication device configured to at least transmit packets to the communication device 10, and detailed description thereof will be omitted.

First Embodiment

In the first embodiment, a configuration, in which the correction value a is calculated based on the minimum delay time of the received packet to correct the delay time, will be described.
1. Correction Method for Delay Time When the packets are transmitted and received without any delay, the actual delay time of the packets is zero. In this case where the actual delay time is zero, the delay time acquired by the delay time acquiring unit 103 is equal to the time difference r between the clocks 101, 201. Accordingly, in the first embodiment, the actual delay time for the minimum delay time is estimated to be zero, and the delay time of the target packet is corrected assuming that the minimum delay time corresponds to the time difference r.

Figure 3:
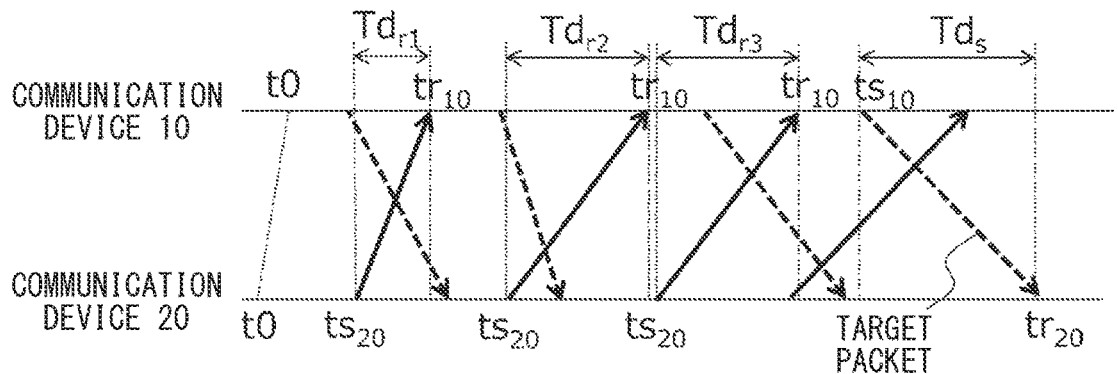
FIG. 3 is a diagram for explaining packets transmitted and received by communication devices according to first to fourth embodiments.

FIG. 3 schematically shows a state in which packets are transmitted and received between the communication devices 10, 20 of the present embodiment. In this case, an example where the delay time $Td_s$ of the target packet, which is the transmitted packet, is corrected using the minimum delay time $Td_{rmin}$ of the received packet will be described. In the following example, a configuration that corrects the delay time of only one target packet selected by the selection unit 104 will be described. However, all packets transmitted and received by the communication unit 102 may be selected as the target packets and the delay time of the target packets may be corrected.

The delay time acquiring unit 103 of the present embodiment is configured to acquire the delay time of the transmitted packet that is selected as the target packet and transmitted by the communication unit 102. The delay time of the transmitted packet is the time length between the transmission time $T_{s10}$ when the communication device 10 transmits the transmitted packet and the reception time $T_{r20}$ when the communication device 20 receives the transmitted packet.

In the present embodiment, the minimum delay time $Td_{rmin}$ of the received packet is estimated to correspond to the time difference r between the clocks 101, 201. The correction unit 105 reads out the minimum delay time $Td_{rmin}$ stored in the memory 106. In the example shown in FIG. 3, $Td_{r1}$ is the shortest in the delay times $Td_{r1}$–$Td_{r3}$, and accordingly the delay time $Td_{r1}$ is read out as the minimum delay time $Td_{min}$. The correction unit 105 calculates the correction value a by setting the minimum delay time $Td_{min}$ as the correction value a. The correction unit 105 corrects the delay time $Td_s$ of the target packet using the calculated correction value a (=$Td_{min}$=$Td_{r1}$). By substituting the correction value a calculated by the present embodiment into the formula 1, the corrected delay time $T_s$ of the target packet can be obtained using the following formula 3.

$$T_s = Td_s - Td_{min} \quad \text{(Formula 3)}$$

(2) Operation of Communication Device 10

Figure 4:
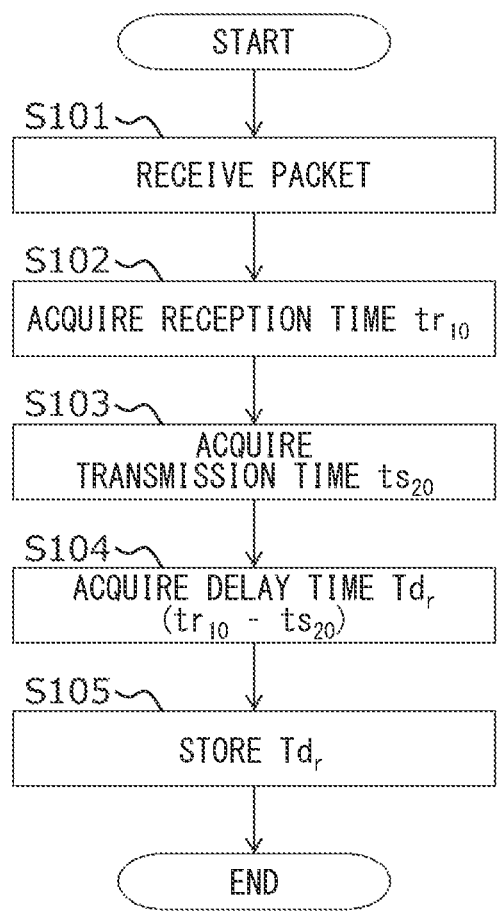
FIG. 4 is a flowchart of an operation of the communication device according to the first embodiment.

The operation of the communication device 10 of this embodiment will be described with reference to FIGS. 4, 5. FIG. 4 shows a process of acquiring the delay time of the received packet used for correcting the delay time of the target packet. In S101, the communication unit 102 receives the received packet transmitted from the communication device 20. In S102, the time when the received packet is received in S101, i.e. the reception time $tr_{10}$, is acquired. In S103, the transmission time $ts_{20}$ when the received packet is transmitted from the communication device 20, which is contained in the received packet, is acquired. In S104, the time length between the transmission time $ts_{20}$ and the reception time $tr_{10}$ is acquired as the delay time $Td_r$. In S105, the acquired delay time $Td_r$ is saved in the memory 106.

Figure 5:
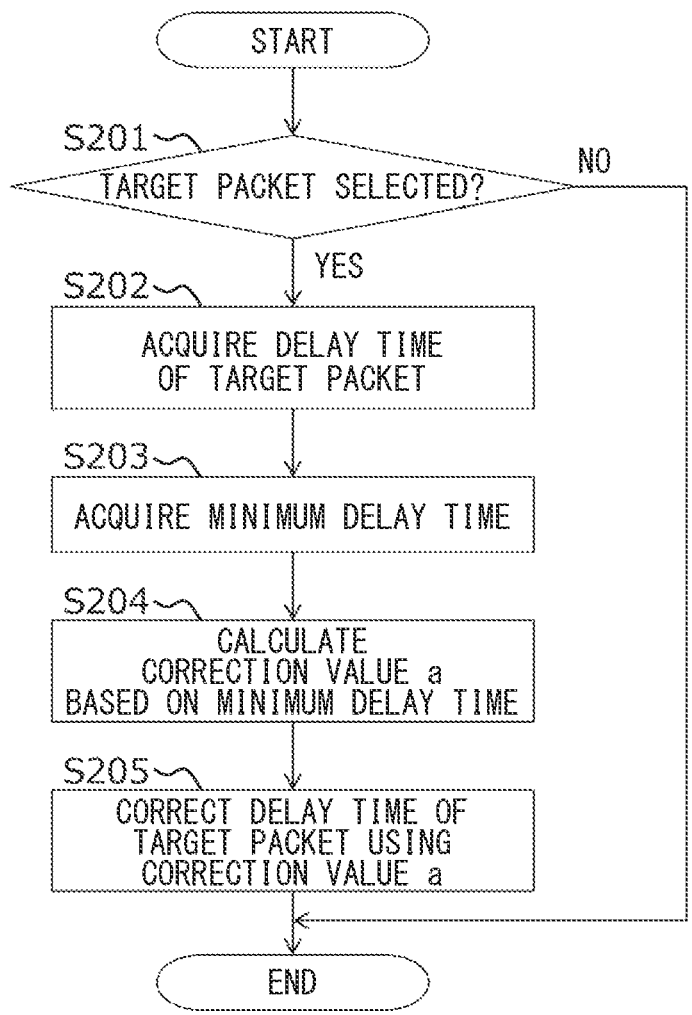
FIG. 5 is a flowchart for explaining the operation of the communication devices according to the first to fourth embodiments.

FIG. 5 shows a process of correcting the delay time of the target packet using the minimum delay time having the minimum value among the delay times acquired by the process shown in FIG. 4. In S201, the selection unit 104 selects the target packet whose delay time is to be corrected. In S202, the delay time $Td_s$ of the target packet selected in S201 is acquired by reading out from the memory 106. In S203, the minimum delay time $Td_{min}$ is read out from the memory 106. The minimum delay time $Td_{min}$ is the smallest value among the delay times of the received packets acquired by the process shown in FIG. 4. In S204, the correction value a is calculated based on the minimum delay time $Td_{min}$ acquired in S203. In the present embodiment, the minimum delay time $Td_{min}$ read out from the memory 106 is used as the correction value a. In S205, the delay time $Td_s$ of the target packet is corrected using the correction value a.

The operation of the communication device 10 shown in FIGS. 4, 5 shows not only a method of correcting the delay time in the communication device 10, but also a processing procedure of the delay time correction program executed by the communication device 10. The order of the processes is not limited to the example shown in FIGS. 4, 5. That is, the order may be swapped as long as there is no restriction, such as a relationship where one step uses the result of the step before it. The same applies to the flowcharts of the embodiments below.
3. Error Between Corrected Delay Time and Actual Delay Time The error of the corrected delay time acquired in the present embodiment is unknown. However, when the value of the minimum delay time of the transmitted packet is known, maximum error of the corrected delay time of the present embodiment can be calculated.

Figure 6:
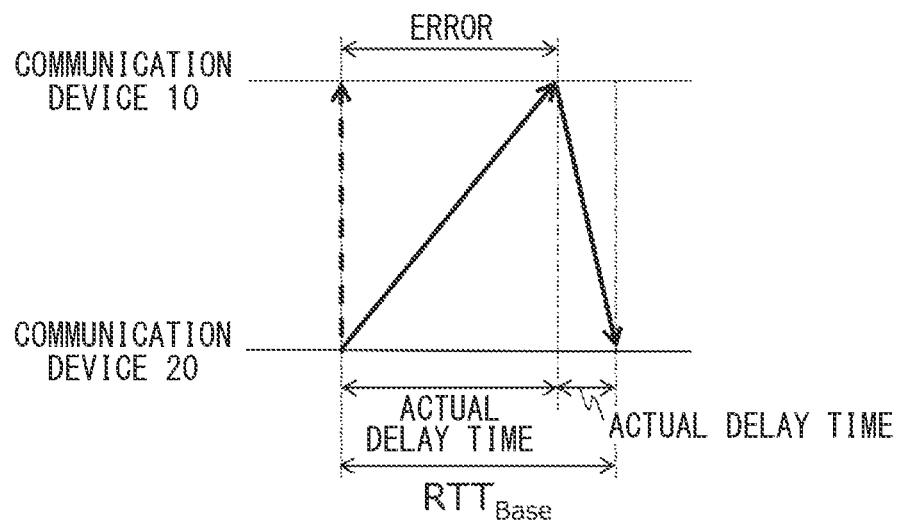
FIG. 6 is a diagram for explaining an error between a corrected delay time and an actual delay time according to the first and second embodiments.

FIG. 6 is a diagram illustrating the maximum error between the corrected delay time T and the actual delay time according to the method of the present embodiment. The dashed arrow shown in FIG. 6 indicates a state where the actual delay time for the minimum delay time $Td_{rmin}$ of the received packet is estimated to be zero. The solid lines indicate the actual delay times of the received packet and the transmitted packet.

When the RTT (Round Trip time) Base is defined as the sum of the actual delay time for the minimum delay time $Td_{rmin}$ of the received packet and the actual delay time for the minimum delay time of the transmitted packet, the RTT Base is expressed as the following formula 4.

$$RTT_{Base} = \{(tr_{10\ min}+a) - ts_{20}\ min\} + \{tr_{20\ min} - (ts_{10\ min}+a)\} = Td_{rmin} + Td_{smin} \quad \text{(Formula 4)}$$

Here, $tr_{10\ min}$ is the reception time of the received packet having the minimum delay time $Td_{rmin}$, $ts_{20\ min}$ is the transmission time of the received packet having the minimum delay time $Td_{rmin}$, $tr_{20\ min}$ is the reception time of the transmitted packet having the minimum delay time $Td_{smin}$, and $ts_{10\ min}$ is the transmission time of the transmitted packet having the minimum delay time $Td_{smin}$.

As expressed in the formula 4, the sum of the actual delay times of the received packet and the transmitted packet is equal to the sum of the delay times of the received packet and the transmitted packet acquired by the delay time acquiring unit 103.

In the present embodiment, the correction value a is calculated based on the assumption that the actual delay time for the minimum delay time $Td_{rmin}$ of the received packet is zero, as indicated by the dashed arrow in FIG. 6. However, the actual delay time for the minimum delay time $Td_{rmin}$ may not be zero as indicated by the solid lines in FIG. 6. When the actual delay time of the received packet is the value of the $RTT_{Base}$, that is, when the actual delay time of the transmitted packet is zero, the difference between the estimated delay time of the received packet and the actual delay time of the received packet is the largest ($RTT_{Base}$). Accordingly, the maximum error between the delay time of the target packet and the actual delay time is the $RTT_{Base}$.

According to the present embodiment, the delay time of the packet communicated between the communication devices whose times are not synchronized can be estimated. Further, according to the present embodiment, the delay time of the target packet can be corrected by information of the delay time of the received packet which is accumulated in the communication device 10 that corrects the delay time, and accordingly the correction process for the target packet by the communication device 10 can be easily performed.

In the first embodiment, it is assumed that the communication devices 10, 20 communicate with each other through the constant communication path. However, the packets transmitted and received between the communication devices 10, 20 may not be always forwarded over the same path. When the communication paths between the communication devices 10, 20 are different, the delay times of the packets may be different for each communication path.

When the communication devices 10, 20 communicate with each other through different communication paths, the delay time acquiring unit 103 acquires the delay time of the packet received through the first communication path and the delay time of the packet received through the second communication path. The correction unit 105 reads out, from the memory 106 as the minimum delay time, the delay time having the smallest value among the delay times of the received packets transmitted from the communication device 20 through the first communication path and the delay times of the received packet transmitted from the communication device 20 through the second communication path. The correction unit 105 calculates the correction value a based on the read minimum delay time.

By calculating the correction value using the shorter delay time to correct the delay time, the error between the corrected delay time and the actual delay time can be smaller. Accordingly, when the communication devices 10, 20 communicate through multiple communication paths, the correction value is calculated based on the minimum delay time among the delay times of the received packets transmitted through all of the communication paths.

When the communication devices 10, 20 communicate using different protocols, the delay times of the packets may be different. Accordingly, it is preferable that the correction value is calculated based on the minimum delay time among the delay times of the received packets transmitted using any one of the protocols even when the protocols used for the communication are different.

The configuration in which the communication between the communication devices 10, 20 is performed through multiple communication paths can be applied to second and fifth embodiments described later.

Second Embodiment

In the first embodiment, a configuration, in which the delay time of the target packet is corrected based on the minimum delay time of the received packet received by the communication device 10, is described. In the second embodiment, a configuration, in which the correction value a is calculated based on the minimum delay time that is the smallest value among the delay times of the received packets and the transmitted packets to correct the delay time of the target packet, will be described.

1. Correction Method for Delay Time

Figure 7:
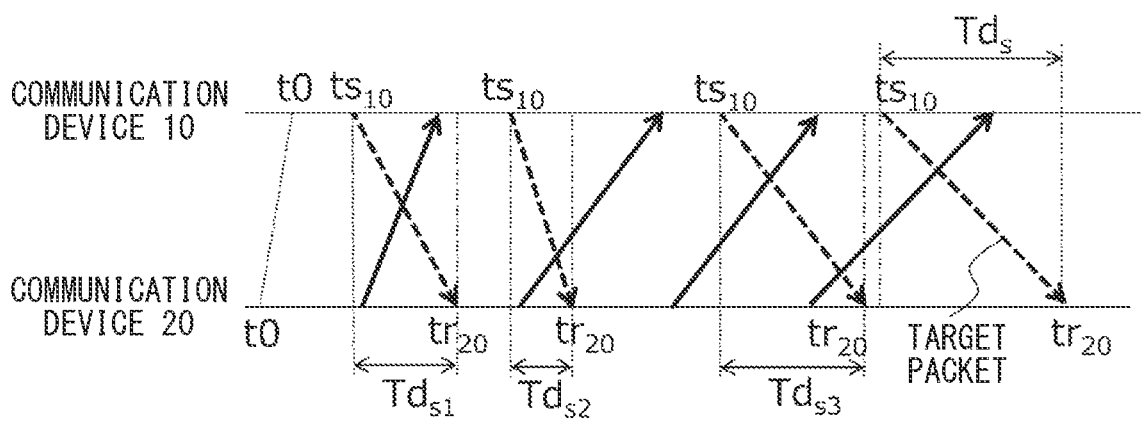
FIG. 7 is a diagram for explaining packets transmitted and received by communication devices according to the second to fourth embodiments.

FIG. 7 schematically shows a state in which packets are transmitted and received between the communication devices 10, 20 of the present embodiment. The delay time acquiring unit 103 of the present embodiment acquires the delay times $Td_{s1}$-$Td_{s3}$ of the transmitted packets shown in FIG. 7 in addition to the delay times $Td_{r1}$-$Td_{r3}$ of the received packets shown in FIG. 3.

The correction unit 105 reads out the minimum delay time from the memory 106 and estimates that the minimum delay time corresponds to the time difference r as in the first embodiment. However, unlike the first embodiment, the minimum delay time in the present embodiment is a delay time having the smallest value among the delay times of the received packets and the delay times of the transmitted packets.

In the cases shown in FIGS. 3, 7, the minimum delay time is the delay time $Td_{s2}$ of the transmitted packet. The correction unit 105 reads out, as the minimum delay time $Td_{min}$, the delay time $Td_{s2}$ stored in the memory 106. The correction unit 105 calculates the correction value a by setting the minimum delay time $Td_{min}$ as the correction value a. The correction unit 105 corrects the delay time $Td_s$ of the target packet using the calculated correction value a ($=Td_{min}=Td_{s2}$). In the examples shown in FIGS. 3, 7, the corrected delay time $T_s$ can be obtained by the formula 4.

(2) Operation of Communication Device 10

The process performed by the communication device 10 of the present embodiment for acquiring the delay time of the received packet and the transmitted packet will be described with reference to FIG. 8. The same steps as those in FIG. 4 are designated by the same reference numerals, and the description thereof will be omitted.

In S301, the delay time $Td_s$ of the transmitted packet transmitted by the communication device 10 is acquired. As described above, the delay time of the transmitted packet can be acquired by acquiring information indicating the delay time of the past transmitted packet. Alternatively, the delay time of the transmitted packet can be acquired from the information indicating the reception time when the communication device 20 received the transmitted packet and contained in the received packet. In S302, the delay time $Td_s$ of the transmitted packet acquired in S301 is stored in the memory.

The delay time of the target packet can be corrected using the processing flow shown in FIG. 5.

3. Error Between Corrected Delay Time and Actual Delay Time

The maximum error between the corrected delay time T and the actual delay time according to the method of the present embodiment is the $RTT_{Base}$ as in the first embodiment.

In general, it is known that the delay in the downlink direction, such as communication from the server device to the client device, is shorter than the delay in the uplink direction, such as communication from the client device to the server device. Therefore, when the communication device 10 is a server device and the communication device 20 is a client device, the delay time of the packet transmitted by the communication device 10 in the downlink direction is likely to be shorter than the delay time of the packet received by the communication device 10 in the uplink direction. Therefore, by calculating the correction value using the smallest value of the delay time of both packets sent by the communication device 10 in addition to packets received by the communication device 10, it is possible to calculate a more accurate correction value.

Third Embodiment

In the present embodiment, a configuration, in which the correction value is calculated based on the minimum delay time that is the smallest value among the delay times of the received packets and the transmitted packets, will be described.

1. Correction Method for Delay Time

In the third embodiment, the actual delay time for the minimum delay time of the received packet is regarded to be equal to the actual delay time for the minimum delay time of the transmitted packet to correct the delay time of the target packet.

The correction unit 105 reads out, from the memory 106, the minimum delay time $Td_{rmin}$ (corresponding to a "first minimum delay time") that is the smallest value among the delay times (corresponding to a "first delay time") which is the time length from the transmission time to the reception time of the received packet. In the cases shown in FIG. 3, the minimum delay time $Td_{rmin}$ of the received packet is the delay time $Td_{r1}$.

The correction unit 105 reads out, from the memory 106, the minimum delay time $Td_{smin}$ (corresponding to a "second minimum delay time") that is the smallest value among the delay times (corresponding to a "second delay time") which is the time length from the transmission time to the reception time of the transmitted packet. In the case shown in FIG. 7, the minimum delay time $Td_{smin}$ of the transmitted packet is the delay time $Td_{s2}$.

When the actual delay time corresponding to the minimum delay time $Td_{rmin}$ of the received packet is regarded to be equal to the actual delay time corresponding to the minimum delay time $Td_{smin}$ of the transmitted packet, the following formula 5 holds.

$$(tr_{10\,min}+a)-ts_{20\,min}=tr_{20\,min}-(ts_{10\,min}+a)$$

$$Td_{rmin}+a=Td_{smin}-a \quad \text{(Formula 5)}$$

Here, $tr_{10\,min}$ is the reception time of the received packet having the minimum delay time $Td_{rmin}$, $ts_{20\,min}$ is the transmission time of the received packet having the minimum delay time $Td_{rmin}$, $tr_{20\,min}$ is the reception time of the transmitted packet having the minimum delay time $Td_{smin}$, and $ts_{10\,min}$ is the transmission time of the transmitted packet having the minimum delay time $Td_{smin}$.

By decomposing the formula 5, the correction value a is expressed as the following formula 6.

$$a=(Td_{smin}-Td_{rmin})/2 \quad \text{(Formula 6)}$$

The correction value a can be expressed as in the formula 7 using the $RTT_{Base}$ described in the formula 4.

$$RTT_{Base}/2=Td_{rmin}+a=Td_{smin}-a$$

$$a=Td_{smin}-RTT_{Base}/2=RTT_{Base}/2-Td_{rmin} \quad \text{(Formula 7)}$$

Then, by substituting the formula 6 (or the formula 7) into the formula 1, the corrected delay time $T_s$ of the target packet can be calculated using the formula 8 below.

$$T_s = Td_s - (Td_{smin} - Td_{rmin})/2 = \quad \text{(Formula 8)}$$
$$Td_s - (Td_{smin} - RTT_{Base}/2) = Td_s - (RTT_{Base}/2 - Td_{rmin})$$

(2) Operation of Communication Device 10

Figure 8:
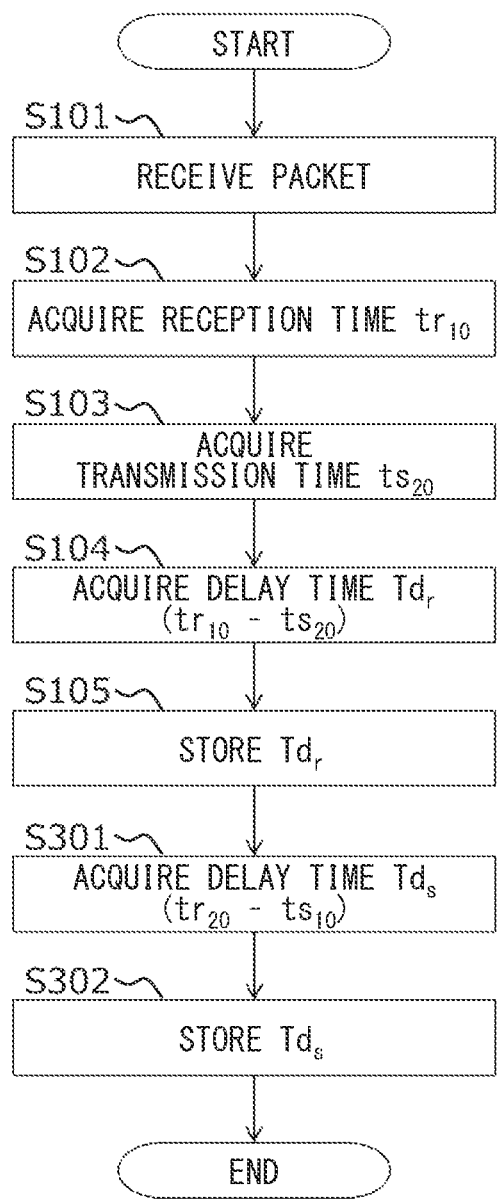
FIG. 8 is a flowchart for explaining the operation of the communication devices according to the second to fourth embodiments.

The communication device 10 of the present embodiment performs the similar operation shown in FIGS. 5, 8.

However, in the present embodiment, in S204 of FIG. 5, the correction value a is calculated based on the minimum delay time $Td_{smin}$ of the transmitted packet and the minimum delay time $Td_{rmin}$ of the received packet. Specifically, the correction value a is calculated by calculating the formula 6 or the formula 7. Regardless of which one of the formulas 6, 7 is used, the correction value a of the present embodiment is the same as the value obtained by halving the difference between the minimum delay time $Td_{smin}$ of the transmission packet and the minimum delay time $Td_{rmin}$ of the received packet. Accordingly, in S204, the correction value can be calculated using any one of the formulas 6, 7.

3. Error Between Corrected Delay Time and Actual Delay Time

Figure 9:
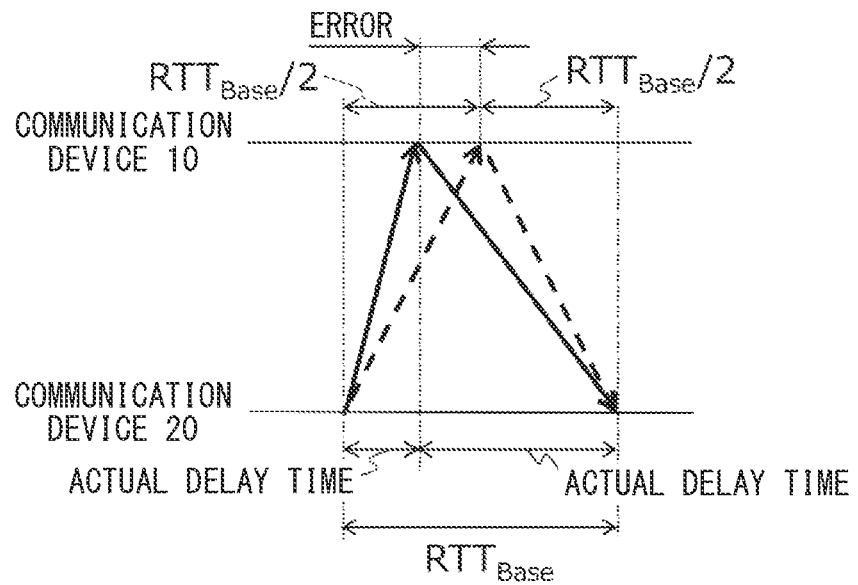
FIG. 9 is a diagram for explaining an error between a corrected delay time and an actual delay time according to the third embodiment.

FIG. 9 is a diagram illustrating the error between the corrected delay time and the actual delay time according to the present embodiment. The dashed line in FIG. 9 indicates a state where the actual delay time for the minimum delay time $Td_{rmin}$ of the received packet is regarded to be equal to the actual delay time for the minimum delay time $Td_{smin}$ of the transmitted packet. On the other hand, the solid line indicates the actual delay time.

The error between the estimated delay time and the actual delay time in the present embodiment is the difference between the $RTT_{Base}/2$ and the actual delay time, and this error is the $RTT_{Base}/2$ at the maximum.

According to the present embodiment, the delay time of the packet communicated between the communication devices whose times are not synchronized can be estimated with an error of $RTT_{Base}/2$ at the maximum.

Fourth Embodiment

In the present embodiment, a configuration, in which the delay time of the target packet is corrected using highly accurate correction value when the lower limit of the round-trip time of the packet through the communication network 30 and the proportion of the delay times in the lower limit of the round-trip time are known, will be described.

1. Correction Method for Delay Time

In some cases, the following values are "known values" (corresponding to a "delay time proportion"): a lower limit (hereinafter, referred to as a "round-trip delay time lower limit") of the sum of (i) the time length from the time when the communication device 20 transmits the received packet to the time when the communication device 10 receives the received packet (corresponding to a "first actual delay time") and (ii) the time length from the time when the communication device 10 transmits the transmitted packet to the time when the communication device 20 receives the transmitted packet (corresponding to a "second actual delay time"); and the proportion of the actual delay time of the received packet and the actual delay time of the transmitted packet in the round-trip delay time lower limit (corresponding to a "delay time proportion"). For example, these values may be preset for each communication device and communication network. When the round-trip delay time lower limit and the delay time proportion are known values, the lower limits of the delay times of the received packet and the transmitted packet can be calculated from these values.

In the present embodiment, the correction value a is calculated by estimating that the difference between the lower limit of the delay time of the received packet and the actual delay time for the minimum delay time $Td_{rmin}$ is equal to the difference between the lower limit of the delay time of the transmitted packet and the actual delay time for the minimum delay time $Td_{smin}$.

The "known value" may be a case where a predetermined value is set in advance or a case where the communication device sets the value based on past data.

The correction unit 105 reads out, from the memory 106, the round-trip delay time lower limit and the delay time proportion, which are the known values, in addition to the minimum delay time $Td_{min}$ of the received packet. The correction unit 105 calculates the correction value a based on these values.

Figure 10:
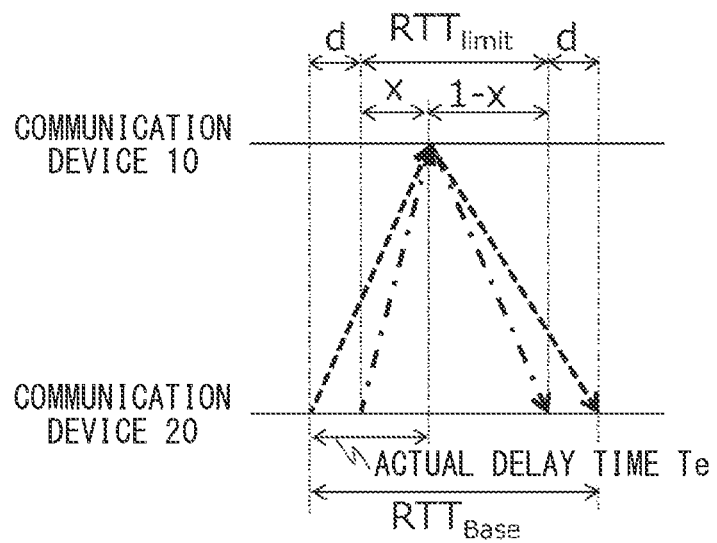
FIG. 10 is a diagram illustrating a correction value calculation according to the fourth embodiment.

FIG. 10 is a diagram describing the present embodiment. The dash-dotted line in FIG. 10 indicates the packet having the round-trip delay time lower limit. The dashed line indicates a state where the difference between the lower limit of the delay time of the received packet and the actual delay time for the minimum delay time $Td_{rmin}$ is regarded to be equal to the difference between the lower limit of the delay time of the transmitted packet and the actual delay time for the minimum delay time $Td_{smin}$. In FIG. 10, the round-trip delay time lower limit is the TRRlimit, the delay time proportion is (x: 1−x) (x<1−x), and the sum of the actual delay time for the minimum delay time $Td_{rmin}$ of the received packet and the actual delay time for the minimum delay time $Td_{smin}$ of the transmitted packet is the $RTT_{Base}$. The difference d between the lower limit of the delay time of the received packet and the actual delay time for the minimum delay time $Td_{rmin}$, and the difference d between the lower limit of the delay time of the transmitted packet and the actual delay time for the minimum delay time $Td_{smin}$ are expressed as the following formula 9.

$$d=(RTT_{Base}-RTT_{limit})/2 \qquad \text{(Formula 9)}$$

When the actual delay time for the minimum delay time $Td_{rmin}$ of the received packet is $T_e$, the value of the actual delay time can be calculated by the following formula 10.

$$T_e=d+x\times RTT_{limit} \qquad \text{(Formula 10)}$$

Here, by substituting the actual delay time $T_e$ for the corrected delay time $T_r$ of the received packet in the formula 2 and substituting the minimum delay time $Td_{rmin}$ of the received packet for the delay time $Td_r$, the correction value a is calculated using the following equation.

$$a=T_e-Td_{rmin} \qquad \text{(Formula 11)}$$

Then, by substituting the formula 11 into the formula 1, the corrected delay time of the target packet can be calculated using the formula 12 below.

$$T_s=Td_s-(T_e-Td_{rmin}) \qquad \text{(Formula 12)}$$

(2) Operation of Communication Device 10

The communication device 10 of the present embodiment performs the similar operation shown in FIGS. 5, 8. However, in the present embodiment, in S204 of FIG. 5, the correction value a is calculated based on the round-trip delay time lower limit and the delay time proportion which are known values and the minimum delay time $Td_{rmin}$ of the received packet. Specifically, the correction value a is calculated by calculating the formula 11.

The formula 12 is a formula used when the minimum delay time $Td_{rmin}$ of the received packet is used. However, when the delay time proportion is (1−x: x) (x<1−x), the corrected delay time T is expressed using $Td_{smin}$ instead of the $Td_{rmin}$.

3. Error Between Corrected Delay Time and Actual Delay Time

Figure 11A:
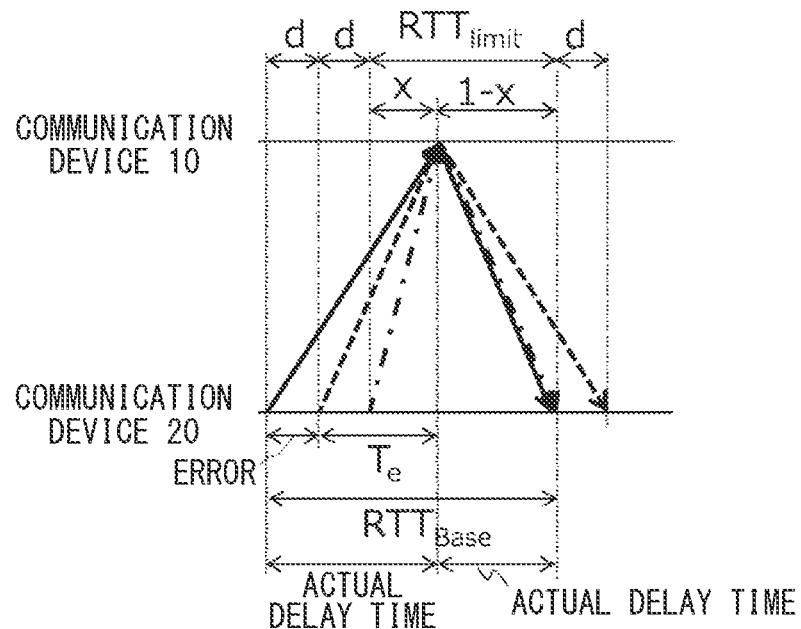
FIG. 11A is a diagram for explaining an error between a corrected delay time and an actual delay time according to the fourth embodiment.
Figure 11B:
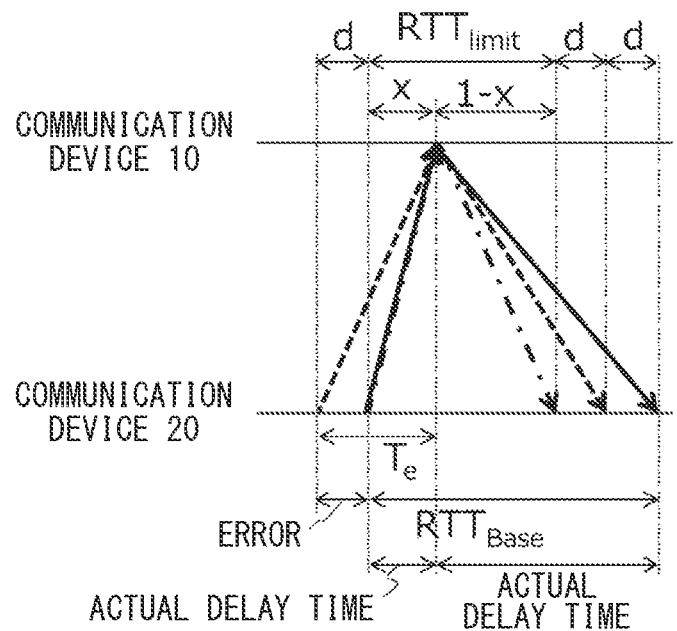
FIG. 11B is a diagram for explaining an error between a corrected delay time and an actual delay time according to the fourth embodiment.

FIG. 11 is a diagram illustrating the error between the corrected delay time and the actual delay time according to the present embodiment. As in FIG. 10, the dash-dotted lines in FIGS. 11A, 11B indicates packets having the round-trip delay time lower limit, and the dashed lines indicate a state where the difference between the lower limit of the delay time of the received packet and the actual delay time for the minimum delay time $Td_{rmin}$ is regarded to be equal to the difference between the lower limit of the delay time of the transmitted packet and the actual delay time for the minimum delay time $Td_{smin}$. The solid line indicates the actual delay time.

FIG. 11A shows a case where the actual delay time of the received packet is larger than the delay time $T_e$ calculated by the formula 10, and the maximum error in this case is d. FIG. 11B shows a case where the actual delay time of the received packet is smaller than the delay time $T_e$ calculated by the formula 10, and the maximum error in this case is d. That is, an error of ±d may occur in the correction value a obtained by the present embodiment. As a result, the maximum error of the delay time of the target packet corrected by using the correction value a is d.

According to the present embodiment, the delay time of the packet communicated between the communication devices whose times are not synchronized can be estimated with an error d ($=(RTT_{Base}-RTT_{limit})/2$) at the maximum.

Fifth Embodiment

In the first to fourth embodiments, the correction value is calculated using the minimum delay time that is the smallest value among the delay times acquired within the predetermined period. However, if there is a discrepancy between the interval at which the clock 101 counts the time and the interval at which the clock 201 counts the time, the time difference r between the clock 101 and the clock 201 may change with the passage of time. In such a case, the accuracy of the correction value corresponding to the time difference r calculated using the first to fourth embodiments may decrease.

Therefore, in the present embodiment, in order to suppress the decrease of the accuracy of the correction value, a predetermined period is set according to the change over time of the time difference r, and the correction value is calculated using the minimum value of the delay times acquired within the predetermined period.

The correction unit 105 of the present embodiment calculates the correction value a based on the minimum delay time that is the smallest value among the delay times acquired by the delay time acquiring unit 103 between a first timing and a second timing. Here, the correction value a of the present embodiment may be calculated using any of the first to fourth embodiments.

The first timing and the second timing are set such that the difference between a "first time difference" and a "second time difference" is at or below a predetermined threshold value. The first time difference is a difference between the time indicated by the clock 101 and the time indicated by the clock 201 at the first timing. The second time difference is a difference between the time indicated by the clock 101 and the time indicated by the clock 201 at the second timing. That is, the first timing and the second timing are set such that a change amount of the time difference r is at or below a predetermined threshold value. The threshold value is an acceptable range for the error, and the round-trip delay time lower limit RTTiimit described in the fourth embodiment may be used as the threshold value. The minimum value or the average value of Ping values measured in the past may be used as the threshold value.

That is, the first timing and the second timing may be set such that a change amount of the time difference r is lower than a predetermined threshold value.

The change amount of the time difference r can be calculated from the change amount of the time difference r per unit time. The change amount of the time difference r per unit time can be obtained from the difference between the absolute times of the clocks 101, 201, or be obtained as a function of a crystal oscillator.

According to the present embodiment, it is possible to suppress a decrease in the accuracy of the correction value that may occur due to a change in the time difference between the clocks of the communication devices over time, and accordingly the delay time can be estimated with higher accuracy.

Other Embodiments

Hereinafter, a configuration using the correction delay time obtained by using the above-described embodiments will be described.

In each of the above-described embodiments, the case where the communication device 10 and the communication device 20 communicate with each other via one communication network 30 has been described. However, when the communication device 10 and the communication device 20 can support a plurality of communication networks, it is assumed that packets are transmitted and received via the plurality of communication networks. Therefore, in this embodiment, a configuration will be described in which the corrected delay time is used when the communication device 10 can communicate with the communication device 20 via a plurality of communication networks.

Figure 12:
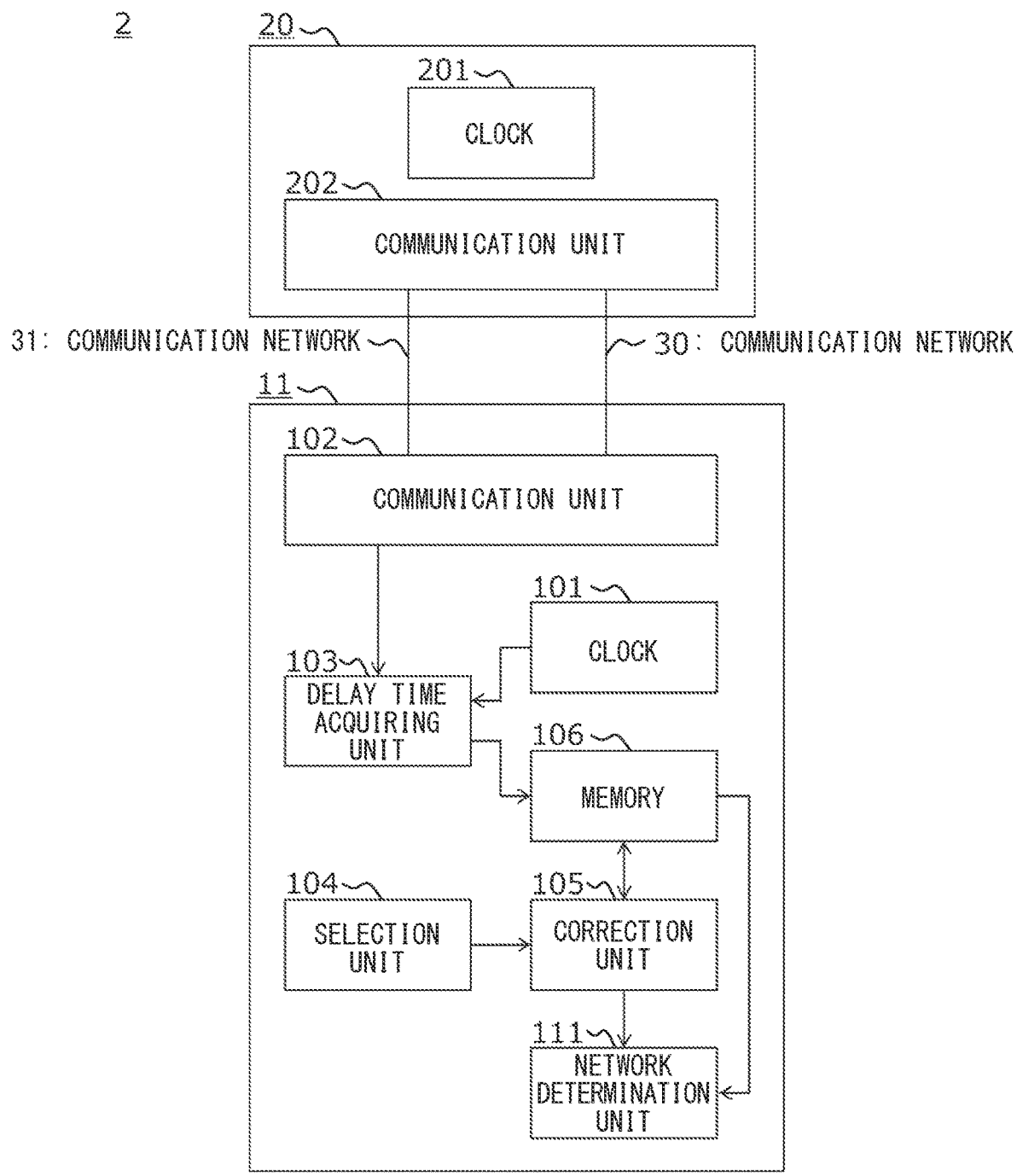
FIG. 12 is a block diagram illustrating a communication device and a communication system including the communication device according to another embodiment.

FIG. 12 illustrates a communication system 2 of the present embodiment. The communication device 11 includes a network determination unit 111 in addition to the configuration shown in FIG. 1. Further, in the communication system 2 shown in FIG. 12, the communication device 11 is configured to communicate with the communication device 20 through the communication network 31 (corresponding to a "second communication network") instead of the communication network 30 (corresponding to a "first communication network").

The correction unit 105 of the present embodiment corrects the delay time of the target packet by using any of the methods described in the first to fifth embodiments. The correction unit 105 of the present embodiment saves, in the memory 106 as a reference delay time (hereinafter, referred to as a first reference delay time) in the first communication network 30, the smallest corrected delay time that is the smallest in the corrected delay times of the packets trans- mitted or received via the first communication network 30. Here, the first reference delay time is estimated to be a delay time in a state where the first communication network 30 is not loaded, that is, in a no-load state.

The correction unit 105 saves, in the memory 106 as a reference delay time (hereinafter, referred to as a second reference delay time) in the second communication network 31, the smallest corrected delay time that is the smallest in the corrected delay times of the packets transmitted or received via the second communication network 31. Similar to the first reference delay time, the second reference delay time is estimated to be the delay time when the second communication network 31 is in a no-load state.

When the communication network used by the communication device 11 is unknown, the network determination unit 111 compares the corrected delay time of the packet transmitted and received using the unknown communication network with the reference delay time stored in the memory 106.

When the corrected delay time is close to the first reference delay time, the network determination unit 111 determines that the unknown communication network is the first communication network 30. In contrast, when the corrected delay time is close to the second reference delay time, the network determination unit 111 determines that the unknown communication network is the second communication network 31. The method for determining which reference delay time is closer to the corrected delay time is, for example, a method such as an absolute value of the difference between the delay time and the reference delay times, past statistical results, and the like.

Figure 13:
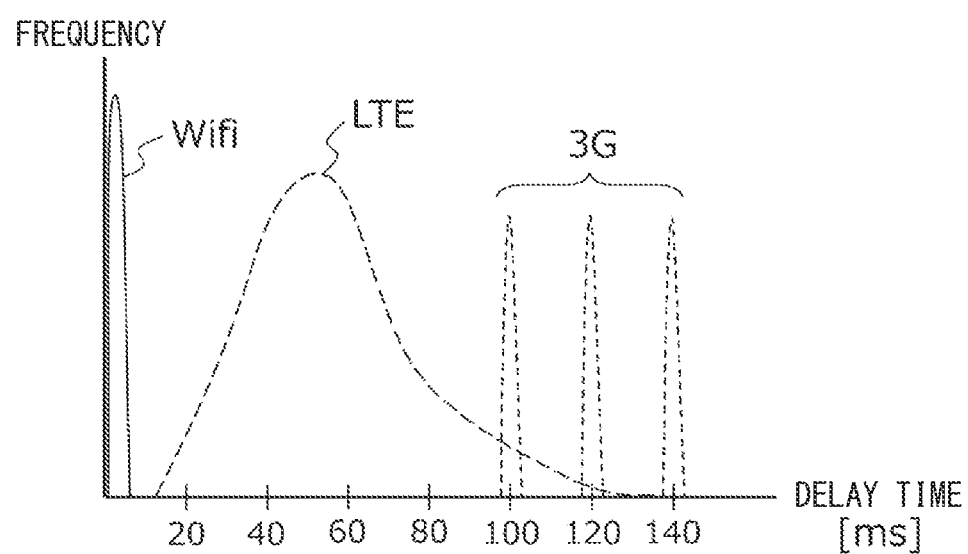
FIG. 13 is a diagram for explaining a delay time due to a communication network according to another embodiment.

FIG. 13 schematically shows the delay time that may occur in communication networks and the occurrence rate thereof. As shown in FIG. 13, different communication networks tend to have different communication delay times that can occur. Therefore, the communication network in use can be determined by comparing the value of the corrected delay time with the communication delay time for each communication network. FIG. 13 illustrates the difference in the delay time of different communication networks, and WiFi, LTE, and 3G communication networks do not necessarily show the delay time shown in FIG. 13.

The case in which the communication device 10 and the communication device 20 can communicate via two communication networks 30, 31 is described as an example, but of course, communication devices may communicate via any number of communication networks.

The communication networks 30, 31 used to transmit and receive packets may each consist of multiple networks. For example, the communication network may consist of 3G and the Internet. Although not shown in FIG. 13, it is known that the delay time of the Internet is usually extremely short compared to LTE, 3G, etc., except when the transmission distance is extremely long, the transmission path includes wireless sections, or there is congestion on the transmission path. Therefore, when the communication network consists of 3G and the Internet, the delay time generated due to the Internet usually has little effect, and the corrected delay time of the target packet tends to be the same as the delay time of 3G. Thus, even if a communication network consists of multiple networks, a network with a large delay time value can be identified when the communication network consists of a network with a tendency to have a large delay time value and a network with a tendency to have a small delay time value.

When the communication device 11 is a device such as a router and a repeater, the communication device 11 may not have detailed information about the communication network in use. According to the present embodiment, even when the communication network in use is unknown, it is possible to identify the communication network by using the delay time as a reference for the communication network.

As another example, the network determination unit 111 may predict and determine the delay when a predetermined load is applied to the first or second communication network by using the reference delay time determined by the method described above and the line speed of the first or second communication network 30, 31.

For example, the following formula 13 is used to predict the delay time $T_i$ that occurs when transmitting and receiving packets.

$$T_i = D_N + \Sigma^i(\text{Data}_{in}Q)/s \quad \text{(Formula 13)}$$

$\text{Data}_{in}Q$ is the amount of data in the queue waiting for packets to be transmitted from the communication unit 102, $D_N$ is the reference delay time, and S is the line speed.

When the reference delay time $D_N$ and the value of line speed S are known for each of the communication networks 30, 31, the delay time $T_i$ that could occur when the amount of data pushed to the queue waiting for transmission is adjusted can be calculated using the formula 13.

In the above description, the network determination unit 111 is configured to identify the communication network using the corrected delay time acquired by the method described in the first to fifth embodiments. However, the network determination unit 111 may identify the communication network using the delay time of the packet transmitted between two communication devices whose times are synchronized.

The communication device according to this embodiment is as follows.

A communication device (11) configured to transmit and receive packets from an outside communication device through a first communication network (30) or a second communication network (31), the communication device comprising: a communication unit (102) configured to receive first packets transmitted from the outside communication device, and transmit second packets to the outside communication device; a delay time acquiring unit (103) configured to acquire a first delay time that is a time length from a second device transmission time when the first packet is transmitted from the outside communication device to a first device reception time when the communication unit receives the first packet, and a second delay time that is a time length from a first device transmission time when the communication unit transmits the second packet to a second device reception time when the outside communication device receives the second packet; a memory (106) configured to store a minimum value among the delay times of the packets transmitted through the first communication network as a first reference delay time, and a minimum value among the delay times of the packets transmitted through the second communication network as a second reference delay time; a selection unit (104) configured to select one of the first packet and the second packet as a target packet; and a network determination unit (111) configured to determine the first communication network or the second communication network through which the target packet is transmitted by comparing the delay time of the target packet with the first reference delay time and the second reference delay time.

CONCLUSION

The features of the communication devices according to each embodiment of the present disclosure are described above.

Terms used in the description of each embodiment are examples and may be replaced with synonymous terms or terms having a synonymous function.

The block diagram used in the description of each embodiment is a diagram in which the configurations of devices and the like are classified and organized by function. An individual function of the functional blocks may be implemented by (i) hardware alone (i.e., by using hardware circuitry including digital and/or analog circuits without CPU), or (ii) software alone (i.e., by using CPU along with memory storing program instructions), or (iii) any combination of the hardware and the software. Further, since the block diagram illustrates the functions, the block diagram can be understood as disclosure of the method and the program that implements the method.

Order of functional blocks that can be grasped as processing, a sequence, and a method described in relation to each embodiment may be changed unless some restriction is imposed, for example, a result from one step is utilized at another step.

The terms first, second, and N-th (N is an integer) used in each embodiment and the claims are used to distinguish two or more configurations of the same type and two or more methods of the same type and do not limit the order and superiority and inferiority.

Further, examples of the communication device described in the present disclosure include the following. Examples of the security management device according to the present disclosure include a semiconductor device, an electronic circuit, a module, and a microcontroller. Examples of a form of a semifinished product include an electronic control device (electronic control unit (ECU)) and a system board. Example of the security management device according to the present disclosure include a mobile phone, a smartphone, a tablet, a personal computer (PC), a workstation, a server, and a router. Further, the security management device may be a device having a communication function such as a video camera, a still camera, a car navigation system.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program may be stored in a non-transitory tangible storage medium including (i) an external storage (e.g., hard disk, USB memory, CD/BD), or (ii) an internal storage (e.g., RAM, ROM) in a special-purpose or general-purpose hardware (e.g., computer). Such a program may be downloaded to the storage medium in the hardware via a communication link from a server. As a result, it is possible to provide a latest function by updating the program.

What is claimed is:

1. A communication device configured to communicate with an outside communication device to transmit and receive packets through a communication network, the outside communication device including a second clock, the communication device comprising:
a first clock;
a communication unit configured to
receive first packets transmitted from the outside communication device, and
transmit second packets to the outside communication device;

a delay time acquiring unit configured to acquire
a first delay time that is a time length from a second device transmission time when the first packet is transmitted from the outside communication device to a first device reception time when the communication unit receives the first packet, the second device transmission time being a time indicated by the second clock, the first device reception time being a time indicated by the first clock, and
a second delay time that is a time length from a first device transmission time when the communication unit transmits the second packet to a second device reception time when the outside communication device receives the second packet, the first device transmission time being a time indicated by the first clock, the second device reception time being a time indicated by the second clock;
a selection unit configure to select one of the first packet and the second packet as a target packet; and
a correction unit configured to
calculate a correction value as a time difference of the first clock and the second clock based on a first minimum delay time that is a minimum value among the first delay times acquired in a predetermined period or a second minimum delay time that is a minimum value among the second delay times acquired in the predetermined period, and
correct the delay time of the target packet using the correction value.

2. The communication device according to claim 1, wherein
the second packet contains the first device transmission time,
the first packet contains the second delay time, and
the delay time acquiring unit is configured to acquire the second delay time contained in the first packet.

3. The communication device according to claim 1, wherein
the first packet contains the second device reception time, and
the delay time acquiring unit is configured to acquire, as the second delay time, a time length from the first device transmission time to the second device reception time contained in the first packet.

4. The communication device according to claim 1, wherein
the target packet is the second packet, and
the correction unit is configured to calculate the first minimum delay time as the correction value.

5. The communication device according to claim 1, wherein
the correction unit is configured to calculate, as the correction value, a smaller one of the first minimum delay time and the second minimum delay time.

6. The communication device according to claim 1, wherein
the correction unit is configured to calculate, as the correction value, a half of a difference between the first minimum delay time and the second minimum delay time.

7. The communication device according to claim 1 wherein
when (i) a round-trip delay time lower limit that is a lower limit of a sum of a first actual delay time that is an actual time length from a time when the other communication device transmits the first packet to a time when the communication device receives the first packet and a second actual delay time that is an actual time length from a time when the communication device transmits the second packet to a time when the other communication device receives the second packet and (ii) a delay time proportion that is a proportion of the first actual delay time and the second actual delay time are known, the correction unit calculates the correction value based on the round-trip delay time lower limit and the delay time proportion in addition to the first minimum delay time or the second minimum delay time.

8. The communication device according to claim 1, wherein
the predetermined period is a period from a first timing to a second timing, and
a difference between (i) a first time difference between a time indicated by the first clock at the first timing and a time indicated by the second clock at the first timing and (ii) a second time difference between a time indicated by the first clock at the second timing and a time indicated by the second clock at the second timing is at or below a threshold value.

9. The communication device according to claim 1, the communication device being configured to communicate with the other communication device through a first communication path and a second communication path, wherein
the first minimum delay time is a minimum value among the first delay times of the first packets transmitted through the first communication path and the first delay times of the first packets transmitted through the second communication path, and
the second minimum delay time is a minimum value among the second delay times of the second packets transmitted through the first communication path and the second delay times of the second packets transmitted through the second communication path.

10. A computer program product for a communication device to correct a delay time, the communication device including a first clock and being configured to communicate with an outside communication device to transmit and receive packets through a communication network, the outside communication device including a second clock, the computer program product stored on a non-transitory computer readable medium and comprising instruction configured to, when executed by at least one processor, cause the at least one processor to:
receive first packets transmitted from the outside communication device;
transmit second packets to the outside communication device;
acquire
a first delay time that is a time length from a second device transmission time when the first packet is transmitted from the outside communication device to a first device reception time when the communication unit receives the first packet, the second device transmission time being a time indicated by the second clock, the first device reception time being a time indicated by the first clock, and
a second delay time that is a time length from a first device transmission time when the communication unit transmits the second packet to a second device reception time when the outside communication device receives the second packet, the first device transmission time being a time indicated by the first clock, the second device reception time being a time indicated by the second clock;

select one of the first packet and the second packet as a target packet;

calculate a correction value as a time difference of the first clock and the second clock based on a first minimum delay time that is a minimum value among the first delay times acquired in a predetermined period or a second minimum delay time that is a minimum value among the second delay times acquired in the predetermined period, and correct the delay time of the target packet using the correction value.

11. A method of correcting a delay time for a communication device including a first clock and configured to communicate with an outside communication device to transmit and receive packets through a communication network, the outside communication device including a second clock, the method comprising:

receive first packets transmitted from the outside communication device;

transmit second packets to the outside communication device;

acquire a first delay time that is a time length from a second device transmission time when the first packet is transmitted from the outside communication device to a first device reception time when the communication unit receives the first packet, the second device transmission time being a time indicated by the second clock, the first device reception time being a time indicated by the first clock, and a second delay time that is a time length from a first device transmission time when the communication unit transmits the second packet to a second device reception time when the outside communication device receives the second packet, the first device transmission time being a time indicated by the first clock, the second device reception time being a time indicated by the second clock;

select one of the first packet and the second packet as a target packet;

calculate a correction value as a time difference of the first clock and the second clock based on a first minimum delay time that is a minimum value among the first delay times acquired in a predetermined period or a second minimum delay time that is a minimum value among the second delay times acquired in the predetermined period, and correct the delay time of the target packet using the correction value.

* * * * *